April 16, 1963  A. J. ROZANSKI  3,085,614
TIRE ANTI-SKID DEVICE
Filed Sept. 26, 1961
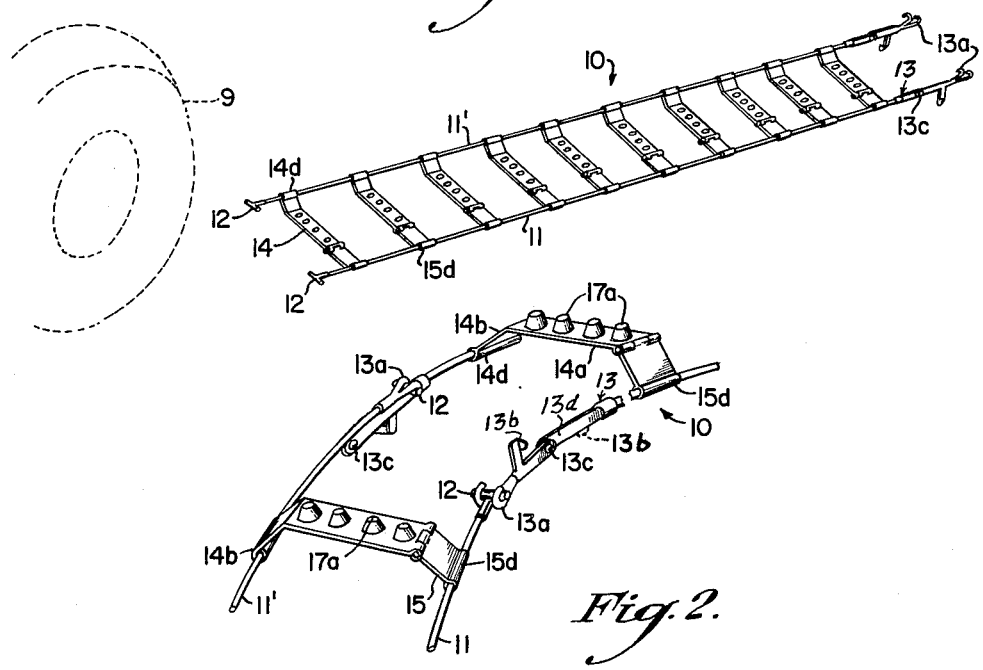
*Fig. 1.*
*Fig. 2.*
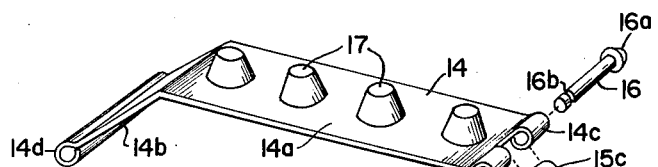
*Fig. 3.*
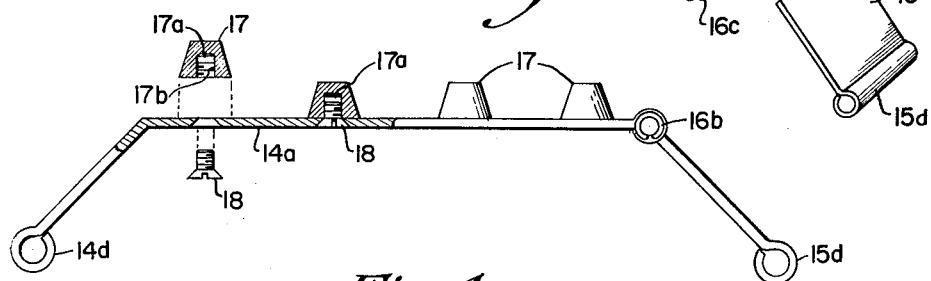
*Fig. 4.*
INVENTOR.
Anthony J. Rozanski
BY
Green, McCallister & Miller

# United States Patent Office 3,085,614
Patented Apr. 16, 1963

3,085,614
TIRE ANTI-SKID DEVICE
Anthony J. Rozanski, 856 Lysle St., Pittsburgh, Pa.
Filed Sept. 26, 1961, Ser. No. 140,831
6 Claims. (Cl. 152—229)

This invention relates to chains or traction devices suitable for tires of vehicles such as automobiles and particularly, to an anti-skid device suitable for muddy, snowy, and icy roads.

This invention has been developed to meet the need for an inexpensive, easily installed and removed, practical traction or anti-skid construction that is particularly suitable for motorists, and that may be mounted on the tire of a wheel in an emergency without the need for jacking up the wheel. There has been a problem in this art from the standpoint that conventional chains have been rather exasperating to the average motorist, due particularly to the difficulty of installing them without the necessity of reaching back of the wheel and up underneath the fender well to untangle and straighten-out their links, etc.

It has been an object of my invention to devise a solution to the problem presented by devising a tire chain or device which will meet disadvantageous features of conventional chains and, at the same time, provide a structure that will be inexpensive and will stand-up under rough conditions of usage;

A further object of my invention has been to devise a tire chain construction which will minimize the difficulties of mounting on and dismounting from the tire of a vehicular wheel and further, that will minimize the chances of spoiling the clothing of the installer when it is necessary to use it in an emergency;

Another object of my invention has been to devise a construction that will eliminate the conventional chain links to provide a much more stable structure for the purpose of laying-out, mounting and dismounting with respect to the tire of a vehicle;

A further object has been to develop an anti-skid or chain device for a vehicular wheel that is provided with cleats that may be replaced and of a nature such that the need for replacement is clearly evident to the motorist, so that necessary replacements may be effected in readiness for further usage;

These and other objects of my invention will appear to those skilled in the art from the illustrated embodiment and the claims.

In the drawings, FIGURE 1 is a perspective plan view illustrating the device of my invention and how it may be laid out in alignment with the tire of a wheel, preliminary to mounting it, as by running the tire a short distance into position on it;

FIGURE 2 is a slightly enlarged sectional perspective view through a portion of my chain or anti-skid device construction, illustrating the mounted positioning of its parts and the manner in which the ends of its side cable parts are latched and moved into a tight and secure mounted relation;

FIGURE 3 is a further enlarged perspective view in partial section illustrating the construction of cross strap member assemblies which carry cleats or treads in my construction;

And, FIGURE 4 is a fragmental end section in elevation through the cross member assembly of FIGURE 3, illustrating the construction and mounting of cleats, studs or caulks which are used in connection therewith.

In carrying out my invention, I provide a traction, chain or anti-skid device 10 which has a pair of transversely-opposed, longitudinally-extending, side support, framing members or cable parts 11 and 11'. End portions of the single length side support members 11 and 11' are provided with latching means 12 and 13 for readily-removably securing each of them together in a circumferential or circular continuous relation and for pulling them up into a tightened position on a vehicle tire, in effecting a mounting of the device on the tire. A group of transversely-extending, substantially equally-circumferentially or longitudinally-spaced assemblies of cross parts or members 14 and 15 are provided and are pivotally or swingably connected and secured at their adjacent ends along the opposed side support members 11 and 11', and may be of about ten or eleven in number for a conventional size tire.

As shown in FIGURES 1 and 2, the cross member assemblies comprise two cross or transverse, strap-like parts 14 and 15 which may be of strap metal of, for example, ⅛ of an inch thickness and 1 inch in width. One of these parts 14 is of a one-piece construction and has a tire-tread-bearing top, substantially horizontal or planar face or tread portion 14a, and a sloped or outwardly-declined side portion 14b which, at its outer, rolled or bent-over end 14d, is securely mounted on the side member 11' (as by a welded-on clamping relation). The member 11' is to constitute an inner side support member when the device 10 is mounted on a tire 9. The portion 14b is adapted to extend along an inner side wall of a tire on which the device is mounted.

A second transverse or side part 15 of the cross assembly, of relatively short-length, is opposed to the portion 14b and is pivotally connected at its upper end by a hinge or knuckle portion 15c to a complementary or interfitting knuckle or hinge-end portion 14c of the tread face portion 14a of the other part 14, as by a headed pin 16. This member or part 15 is adapted to extend in an outwardly-declining relation along the outer side wall of the tire 9 and is, at its outer rolled or bent-over end portion 15d, securely-rigidly mounted (in the same manner as 14d on 11') on the outer side support member or cable part 11. The pin 16 has a head portion 16a at one end and a groove portion 16b adjacent its other end. A split spring clip or washer 16c is adapted to engage within the groove 16b to securely but removably hold the pin 16 in position for hinging or pivotally connecting the adjacent ends of the parts 14 and 15 together.

The one-piece construction of the inner strap member 14 which provides the cross tread portion 14a and the inner side wall portion 14b, greatly facilitate the mounting of the device 10 on the tire 9 and give it more unity in simplifying such mounting, along with the construction and connected relationship of the other parts. The use of longitudinal or circumferential, single piece or integral, side supporting or positioning members 11 and 11', such as braided cables, for example of ³⁄₁₆ inch, non-corrosive, aircraft cable material, eliminates the difficulty which has been heretofore encountered with chain links which complicate the mounting and dismounting of a device, due to the tendency of links to tangle with each other and with other parts and to pivot or move in all directions, such as to require a straightening tension until the device is mounted.

In addition, I provide cleats, studs or caulks 17 for the cross tread or transverse face portion 14a of each unitary main part 14 of each cross assembly of suitable metal construction having a substantially frusto-conical shape. Each cleat 17 is of somewhat frusto-conical shape and is constructed and mounted for easy replacement and, in this connection, has a bore portion 17a extending centrally-upwardly from its under, substantially planar face. The bore portion 17 has a threaded portion 17b that extends a short distance to receive a threaded stem of a mounting set screw 18. The set screw 18 is adapted to extend upwardly through one of a group of transversely spaced-apart countersunk holes in the cross tread portion 14a of the main part 14 of the cross member assembly. As will be noted, the screw 18 has a cone-shaped head to fit flush within the countersunk hole of one of the group of transversely spaced-apart holes in the portion 14a.

It will be noted that the end of the stem of each mounting screw 18 terminates in a spaced relationship with the closed upper end or wall of the bore portion 17a of each cleat 17. This serves two important purposes. In the first place, it visually indicates the need for replacing of a cleat when its relatively planar or flat, smaller size or diameter of outer face has been worn down to expose the bore hole. In the second place, it prevents wear and jamming of the set screw 18 in its threaded mounting which would otherwise occur, if the end of the set screw abutted the end of the bore of the cleat. I have found that cleats of relatively low profile of, for example ½ of an inch in height, are advantageous as used with a relatively thin thickness of cross strap members. This is true, both from the standpoint of facilitating mounting and dismounting of the device 10 within the fender well of a vehicle, and from the standpoint of avoiding abrasion with the inside of the fender well, particularly, when the axle flexes with movement of springs of the vehicle.

My construction is also such that the tendency for the device to break and wind around the brake drum or break the hydraulic fluid lines of a vehicle is minimized and further, from the standpoint that wear and tear is minimized on the cleats. Wear may be quickly determined to indicate whether the cleats need replacement or not. It will be noted that, in my construction, I have minimized the number of parts and pivotal connected relationships which I have found to be important in facilitating the mounting and dismounting of the device, and the prevention of the knotting or jamming of its parts with respect to each other.

The knuckle joint used between the ends of each cable 11 and 11' is of a lever-acting binding type which facilitates the insertion of one end of the side support member with respect to its other end, and provides for drawing the ends up tightly when its lever arm is pivoted to its latching-down position. As shown in FIGURES 2 and 3, the end portion 12 is of T-shape to fit or initially latch within a claw-like, lever arm portion 13a of the end portion 13. In FIGURE 2, the latching portions of the side support member or cable 11 are in such a preliminary position. The portion 13 has a final latch-securing tab or finger portion 13b and, its flattened inner end portion 13 is pivotally connected at 13c to the portion 13a. When the portion 13a is turned or pivoted upwardly in FIGURE 2 and the tab portion 13b is engaged under the portion 13d (see the dotted line position of this figure as to 13b), the cable ends are pulled-up or shortened and are in their final latched positioning with each other. This tightens each cable or side support member 11 and 11' on the tire 9 on which the device 10 is being mounted. In FIGURE 2, the side support member or cable 11' is shown in its final, detachably-secured, shortened and end-connected, continuous relationship.

What I claim is:

1. In an anti-skid device for vehicle tires and the like which comprises, a pair of unitary transversely spaced-apart longitudinally-extending side support members, a group of longitudinally spaced-apart and transversely-extending cross member assemblies secured at their opposite ends on said side support members; each of said cross member assemblies comprising, a first part having a cross tread portion and an outwardly-declining side portion secured at its end on one of said side support members, and a second part in a transversely-opposed and spaced-apart relation with the side portion of said first part; said second part being pivotally-connected at one end to the cross tread portion of said first part and declining outwardly therefrom, and said second part being secured at its other end to the other of said support members.

2. A device as defined in claim 1 wherein each of said side support members has interlatching end portions to secure them together and define a substantially continuous side support when the device is mounted on a vehicle tire.

3. A device as defined in claim 2 further comprising, a plurality of cleats for extending upwardly from said cross tread portions of said cross member assemblies, each of said cleats being of substantially frusto-conical shape and having a bottom face for supportably receiving said cross tread portion, a threaded bore portion open to its bottom face, and an upper end wall that closes off its bore portion; and a plurality of set screws that are positioned to extend outwardly from said cross tread portion for removably securing said cleats thereto by threadably engaging said threaded bores, each of said set screws being of a length to leave a spacing between its outwardmost end and said upper end wall.

4. A device as defined in claim 3 wherein each of said set screws extends through said cross tread portion and has a head mounted in a counter-sunk relationship from the underside of said cross tread portion.

5. A traction device suitable for the tire of a vehicular wheel which comprises, a pair of spaced-apart longitudinally extending inner and outer side support members of cable construction, ends of each of said side support members having pull-up latching means for providing a continuous support member when positioned on the tire, a series of cross member assemblies disposed in a transversely-extending and longitudinally-spaced-apart relationship along and between said pair of support members; each of said assemblies comprising, a first strap-like part having a cross tread portion to lie along the tread of the tire and having an outwardly-declining side portion to lie along an inner side wall of the tire, the side portion of said first part having an end portion secured on the inner one of said side support members, a second strap-like part, said second part being hingedly connected at one end to the cross tread portion of said first part and extending in an outwardly-declining relation therefrom to lie along an outer side wall of the tire, said second part having an opposite end portion secured on the outer one of said side support members; a group of cleats for the cross tread portion of said first part, each of said cleats having a substantially planar and widened bottom face and a bore portion projecting upwardly therewithin from said bottom face and terminating in a closed upper end wall, said bore being internally-threaded, a group of counter-sunk holes in the cross tread portion of said first part, and headed set screws projecting upwardly from an underside of the cross tread portion of said first part through the counter-sunk holes therein and threadably engaging within the bore portions of said cleats to securely hold said cleats in position on the cross tread portion, and the ends of said set screws having a spaced relation with the closed upper end wall of said bore portions.

6. A device as defined in claim 5 wherein the secured end portion of the side portion of said first part and the secured end portion of said second part are bent over said inner and outer side support members.

References Cited in the file of this patent

UNITED STATES PATENTS

| | | |
|---|---|---|
| 984,183 | Baxter | Feb. 14, 1911 |
| 1,316,757 | Arduser | Sept. 23, 1919 |
| 2,134,040 | Gravina | Oct. 25, 1938 |
| 2,252,027 | Pasquarella | Aug. 12, 1941 |
| 2,310,467 | Schwab | Feb. 9, 1943 |
| 2,432,329 | Marthinsen | Dec. 9, 1947 |